United States Patent [19]

Legros et al.

[11] 4,408,785

[45] Oct. 11, 1983

[54] ENGINE VIBRATION FILTRATION SYSTEM

[75] Inventors: André Legros, Marly le Roi; André Chalesle, Paris, both of France

[73] Assignee: Regie Nationale des Usines Renault, Boulogne-Billancourt, France

[21] Appl. No.: 277,041

[22] Filed: Jun. 24, 1981

[30] Foreign Application Priority Data

Jun. 27, 1980 [FR] France ................. 80 14349
May 12, 1981 [FR] France ................. 81 09393

[51] Int. Cl.³ .................. F16L 55/04; F16L 27/04
[52] U.S. Cl. .................. 285/49; 285/166; 285/263; 285/267; 285/268
[58] Field of Search .............. 285/166, 167, 263, 267, 285/268, 270, 271, 49

[56] References Cited

U.S. PATENT DOCUMENTS

| | | | |
|---|---|---|---|
| 871,757 | 10/1907 | Greenlaw | 285/267 |
| 1,561,033 | 11/1925 | Spencer | 285/167 |
| 3,064,419 | 11/1962 | Ward | 285/166 X |

Primary Examiner—Richard J. Scanlan, Jr.
Attorney, Agent, or Firm—Oblon, Fisher, Spivak, McClelland & Maier

[57] ABSTRACT

A system for filtering vibrations from an internal combustion engine towards an exhaust pipe wherein an interruption is arranged on the latter and as close as possible to the source of the vibrations, the ends of the pipe facing the level of the interruption having the shape of a spherical area, a composite joint between these ends being then re-established via a first internal, cylindrical element with beveled ends fitting together within the preceding areas and a second external element supported by the central part of the latter while its ends hold tightness segments against the upper part of the spherical areas, at least one space being provided between these two elements allowing the placement of a ring, two envelopes being in addition crimped onto the widened ends of the second element supported on the spherical areas, thus holding the composite joint in place.

5 Claims, 5 Drawing Figures

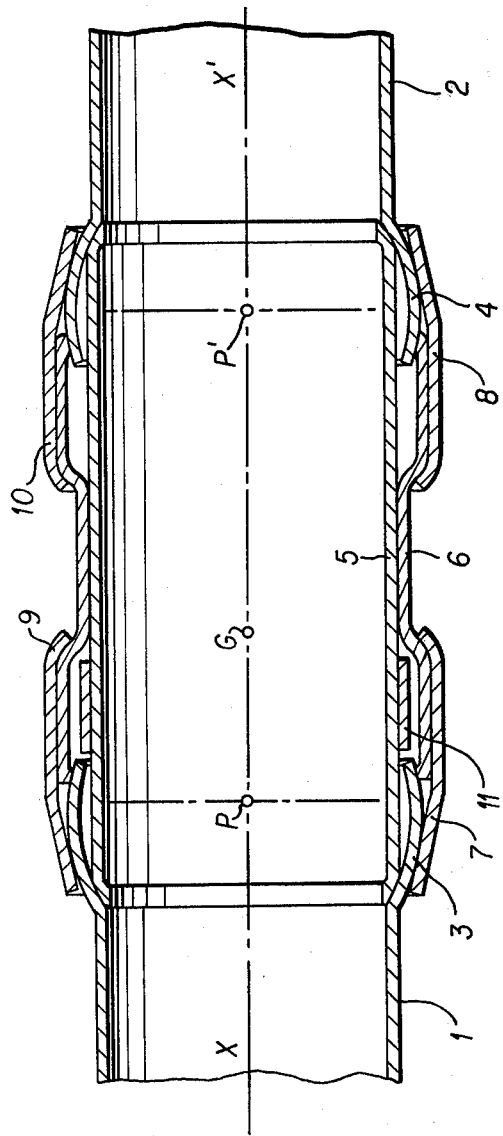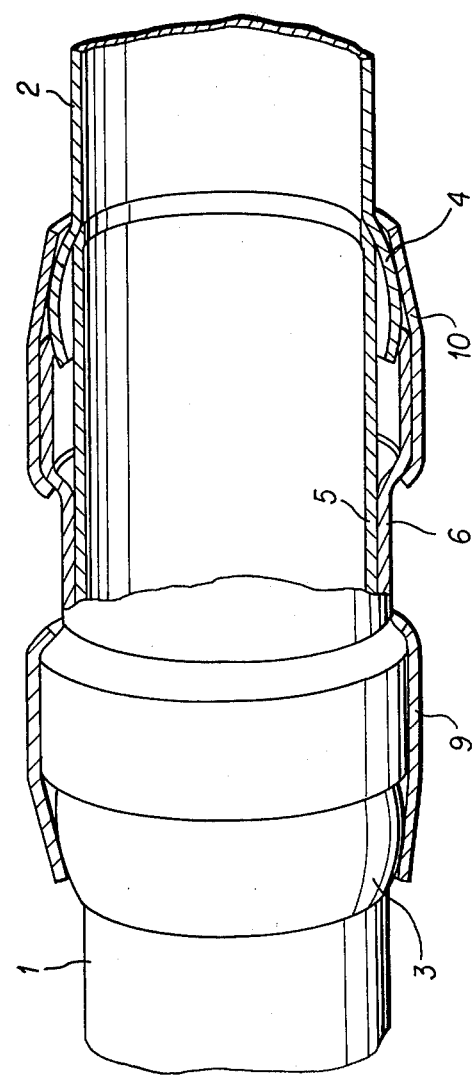

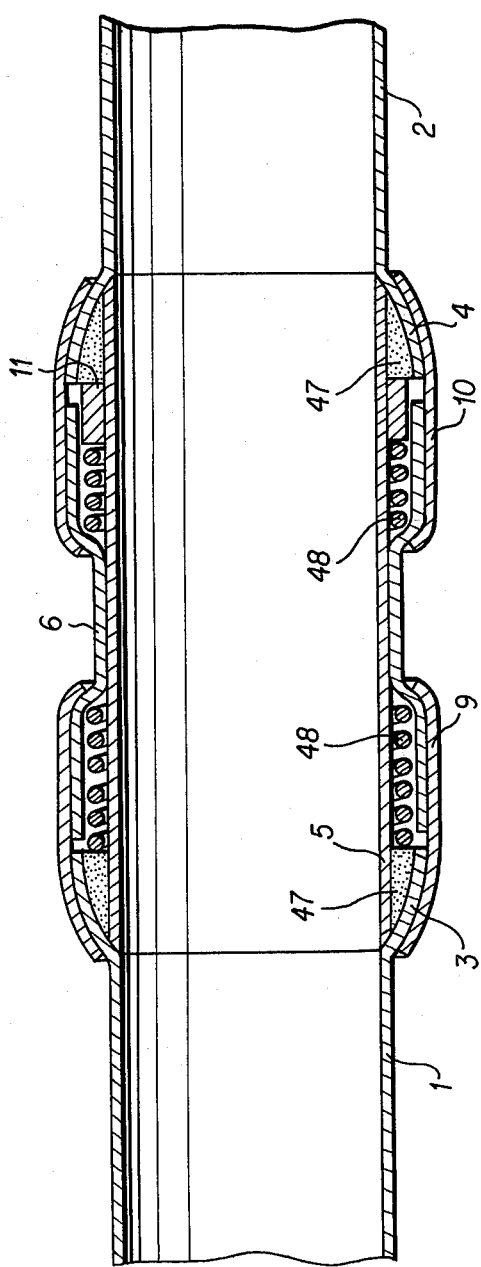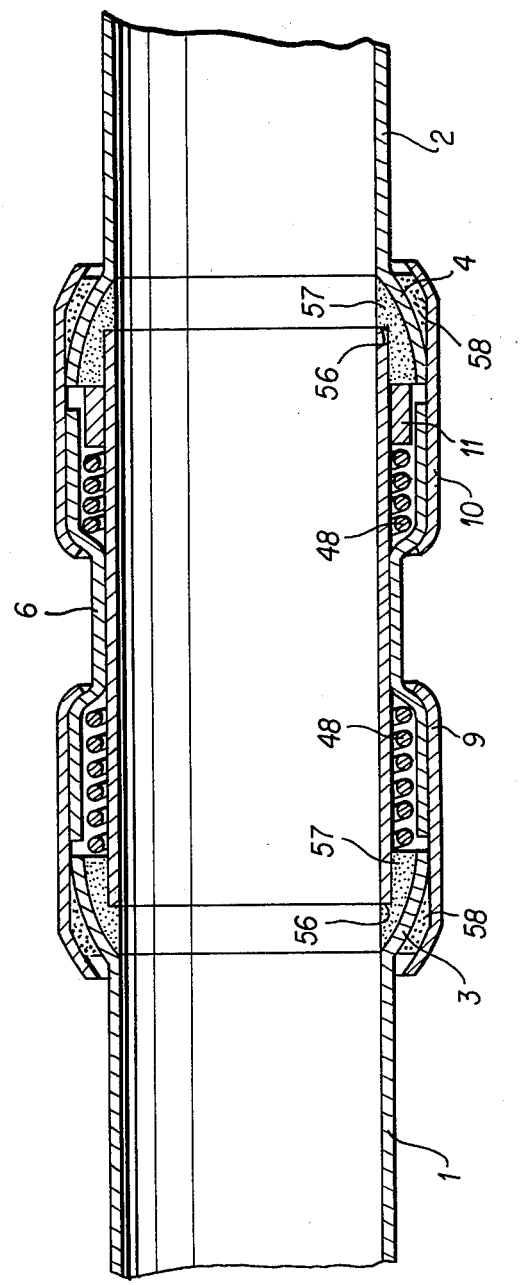

ENGINE VIBRATION FILTRATION SYSTEM

BACKGROUND OF THE INVENTION

1. Field of the Invention

The present invention refers to a device mounted on an exhaust pipe for the gases from an internal combustion engine and serves to filter out or dampen the vibration coming from the latter, while preventing the creation of charge losses in the flow of the gases. This device is placed as close as possible to the engine, even at the point where the latter joins the exhaust pipe.

2. Description of the Prior Art

Frequently coupling of these two parts is achieved by simple bolting which has the drawback of transmitting all the vibrations produced by the engine into the exhaust pipe. In addition to producing noise, this arrangement in some cases leads to rupture of the pipe.

Joints are also known which consist of the cooperation of one of the ends to be joined, in the shape of a cone, with the other end, partly spherical, these two elements being held in contact by means of flanges pressed together, in some cases with the addition of springs in series. The drawback of this solution lies in the fact that in order to have sufficient sealing it is necessary to strongly tighten the two parts in contact, which reduces their mutual swiveling capacity. Consequently, only large-scale spring movements are possible, to the exclusion of the small vibrations which are thereby transmitted without any appreciable decrease in their harmfulness.

SUMMARY OF THE INVENTION

The object of the present invention is to alleviate the aforementioned drawbacks while achieving sufficient sealing with respect to the movable parts to be joined without creating any major tightening stress between them. The master primary idea on which rests the filtration of vibrations according to the present invention is derived from the "lesser shock" principle well known in the field of physics.

It is experimentally known that when a heavy hammer is used the placement of its grip by the operator is not inconsequential. Indeed, the shock of the hammer is felt unequally in each area of the handle, and depending on the operator's grip the shock is felt in the operator's arm with a greater or lesser intensity. With P being the hammer's center of impact and G the center of gravity of the whole including the handle, there exists a point P' where the hammer can be held with a "lesser shock" return, the placement of P' being linked to the preceding parameters according to the general formula:

$$GP \times GP' = p^2$$

P being the radius of gyration of the corresponding moment of inertia p, itself linked to the inertia I and to the weight m of the object by the following formula:

$$I = mp^2$$

According to the invention, a discontinuation or connecting portion is created in the pipe, and by analogy with the foregoing, the vibrations coming from the engine and reaching the free end of that part of the pipe linked to the engine are considered to be incidental shocks. Furthermore, connecting portion is arranged so that the free end of the other part of the pipe facing the interruption and to which the interruption will be joined in an appropriate manner is the placement of the system's "lesser shock."

According to the present invention, a connection is arranged in the exhaust pipe, located as close as possible to the source of the vibrations, the ends of the pipe facing each other at the level of the source having the form of a spherical area, with a composite joint between these ends then being re-established by means of a first internal, cylindrical element with beveled edges fitting together within the preceding areas with a second, external element being supported by the central part of the latter while its end hold tight sealing segments against the upper part of the spherical areas, at least one space being provided between these two elements allowing the placement of a ring, two envelopes being in addition crimped onto the widened ends of the second element being supported on and enveloping the spherical areas, thus holding the composite joint in place.

In a second embodiment of the invention, tight sealing of the aforementioned joint is appreciably improved. To do this, the preceding sealing segments, which under some circumstances may be insufficient, are replaced by a higher-performance sealing capability mechanism which in addition in some instances reduces friction between the moving parts.

BRIEF DESCRIPTION OF THE DRAWINGS

Various other objects, features and attendant advantages of the present invention will be fully appreciated as the same becomes better understood from the following detailed description when considered in connection with the accompanying drawings in which like reference characters designate like or corresponding parts throughout the several views, and wherein:

FIG. 1 shows a longitudinal section of pipe in accordance with the present invention;

FIG. 2 is a partial section view of FIG. 1;

FIGS. 4 and 5 shows an analogous sectional view of second and third embodiments of the present invention in which tightness is achieved by utilizing graphite elements.

DETAILED DESCRIPTION OF THE PREFERRED EMBODIMENTS

Figure 3:
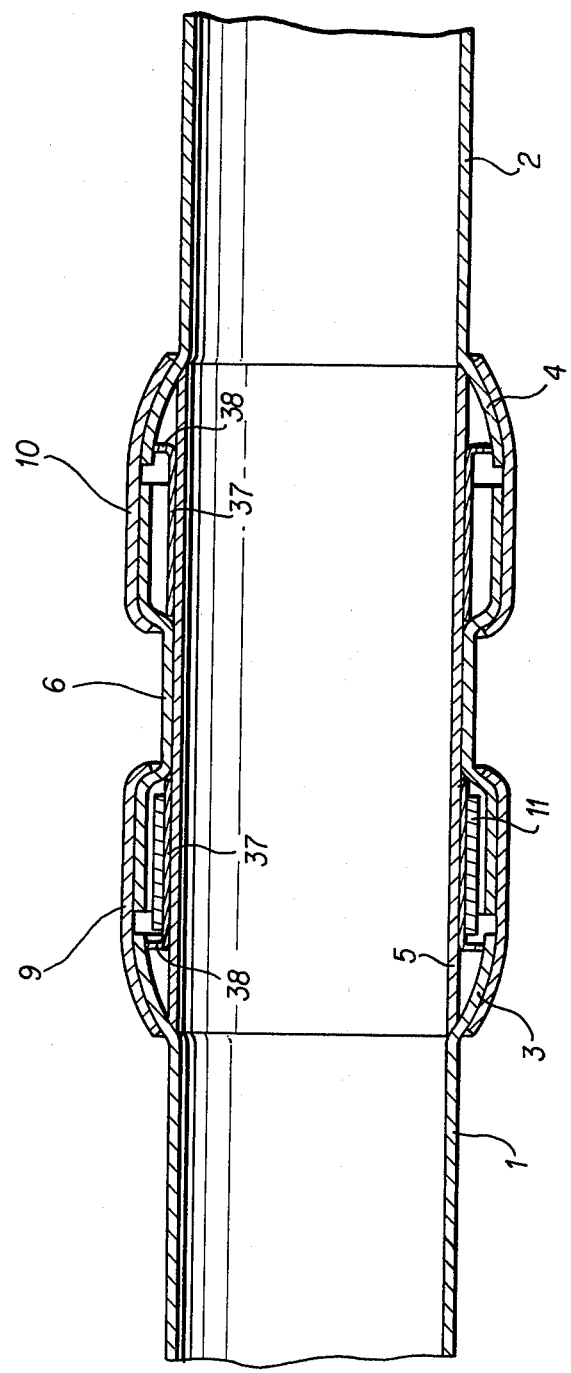
FIG. 3 is a longitudinal sectional view of a second embodiment of a joint according to the present invention assuring tight sealing by the provision for a flanged sleeve.

Referring now to FIG. 1, the ends 1, 2 of the pipe parts to be joined have, respectively, spherical areas 3 and 4 linked to one another by an internal cylindrical element 5 with beveled ends and fitting together within the preceding areas. This assures the pipe's continuity with a minimum of charge losses as well as passing along longitudinal compression stress.

A second connecting element 6, external of element 5, is supported at its central part by element 5, while its ends hold tight sealing segments 7, 8 against the external upper surface portion of spherical areas 3, 4. At least one space is provided between elements 5 and 6 for placement of a ring 11. Two envelopes 9, 10 crimped onto the widened ends of element 6 as well as onto the spherical areas thereby enveloping those areas to hold the unit as a whole in place (also see FIG. 2). Preferably, a material having a low friction characteristic is placed between the contacting parts of the spherical areas 3, 4 with the corresponding parts of envelopes 9, 10.

The importance of the presence of ring 11 is to be noted and the precise placement and weight of ring 11 are determined experimentally so as to allow displacement of the center of gravity G of the entire joint. Then, along a virtually axial line, points P and P' are considered corresponding respectively to the impact center of the vibrations in the spherical area of that part of pipe 1 linked to the engine, and the lesser shock center which is located a priori in the area of sphere 4. It is then necessary that the center of gravity G be displaced according to the foremula $GP \times GP' = p^2$ discussed above. This is precisely obtained by varying the characteristics of ring 11, which affects the weight of the joint as a whole and thus its center of gravity G.

In operation, the relative rotation of the spherical elements with relation to the envelopes 9, 10 make it possible to withstand the displacements due to the strongest vibrations. Furthermore, vibrations arising in spherical area 3 are not found in area 4, since the points P—P' and G have been located in such a way that P' in area 4 is precisely located at the unit's "lesser shock" center. In this way undesirable vibrations which are the source of mechanical constraints and noises are prevented from being transmitted beyond the joint according to the present invention.

Now considering the embodiment in FIG. 3, as in the preceding embodiment, this embodiment includes two ends 1 and 2 of the exhaust pipe to be joined, their ends being in the shape of spherical areas, respectively, 3 and 4, the first cylindrical, internal joint element 5 with beveled ends, the second cylindrical, external joint element 6 supported at its central part by element 5, ring 11 for adjusting the center of gravity of the composite joint and envelopes 9,10 crimped onto the widened ends of element 6 and onto spherical areas 3, 4.

Unlike the preceding joint in which tightness segments are pressed by the ends of external connecting element 6 against the upper part of the spherical areas 3, 4 consituting the ends of the pipes to be joined, according to this embodiment tight sealing of the segments is performed by sleeves 37 having a flange 38 disposed within the ends 3, 4.

As can be seen in FIG. 3, the edge of flange 38 creates a tight seal with the inside face of spherical ends 3, 4 of the pipes to be joined. The edge of flange 38 is pressed and held in this position by the central part of second external element 6. Rings 11 are mounted onto one or the other of the sleeves 37.

This embodiment has the advantage of reducing the amount of exhaust gas escaping at the level of the joint, of having a low cost and reduced volume, and of assuring minimum frictional losses between the elements in contact in the composite joint.

In the embodiment in FIG. 4, the essential difference in relation to the joint in FIG. 1 results from replacing the preceding tight sealing members in the form of flanges 37,38 by a ring 47, the external face of which corresponds to the internal face of one spherical ends 3, 4 of the pipes to be joined. Rings 47 are composed of graphite and are pressed by a spring 48 supported on the central part of external joint element 6 against the inside face of the funnel-shaped ends 3,4 of the pipes to be joined.

Spring 48 and ring 47 are positioned on the surface of internal joint element 5. Here again, the very nature of graphite ring 47 considerably reduces the friction in these areas and allows for sufficient tight sealing against leakage of the exhaust gases. It will again be noted that ring 11 for adjusting the center of gravity of the joint is arranged in this case directly on the surface of the internal element 5 and is pressed by spring 48 onto graphite ring 47.

The embodiment in FIG. 5 makes use of graphite tight sealing members, as before. However, in the present embodiment such are divided in such a way that one pair of graphite elements 58 is placed between the surface of spherical areas 3, 4 and the inside face of the outer ends of envelopes 9,10, while another pair of graphite elements 57 is located between the inside face of the spherical areas 3, 4 and the ends of the internal element 5. It will be noted that in the present embodiment elements 57 include a set-back portion 58 allowing for the introduction of the ends of the internal element 5 which, in this case, may be straight. This further improves the tightness of the joint against leakage of exhaust gases as well as reducing friction.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pipe joint for filtering vibrations produced by an internal combustion engine comprising:
   an exhaust pipe assembly connected to said engine and which further comprises first and second pipes having first and second adjacent end portions, each of said end portions forming a spherical member:
   a connecting mechanism interconnecting said first and second end portions, wherein said connecting mechanism further comprises;
   an internal cylindrical element having first and second beveled end portions disposed, respectively, within said spherical members of said first and second end portions;
   a second external element mounted on a central portion of said cylindrical element and having first and second opposite ends forming sealing portions sealingly engaging external surface portions, respectively, of said spherical members of said first and second end portions;
   a ring member mounted on said cylindrical element between said cylindrical element and a portion of said second element; and
   first and second envelope members engaging and interconnecting, respectively, said first and second spherical members and said opposite ends of said second element for holding the pipe joint in place.

2. A pipe joint as set forth in claim 1, wherein said first end portion further comprises a free end not directly connected to the engine and wherein said ring member further comprises means for displacing the center of gravity of the pipe joint so as to shift a center of lesser shock of the pipe joint to a point located within the spherical member formed at said first end portion.

3. A pipe joint for filtering vibrations produced by an internal combustion engine comprising:
   an exhaust pipe assembly connected to said engine and which further comprises first and second pipes having first and second adjacent end portions, each of said end portions forming a spherical member;

a connecting mechanism interconnecting said first and second end portions, wherein said connecting mechanism further comprises;

an internal cylindrical element having first and second beveled end portions disposed, respectively, within said spherical members of said first and second end portions;

a second external element mounted on a central portion of said cylindrical element and having first and second opposite ends;

a ring member mounted on said cylindrical element between said cylindrical element and a portion of said second element;

first and second envelope members engaging and interconnecting, respectively, said first and second spherical members and said opposite ends of said second element for holding the pipe joint in place; and sleeve means mounted on said cylindrical element having a flange portion outwardly radially extending therefrom at opposite end portions thereof, said flange portions sealingly engaging interior surface portions of each of said spherical members and wherein said sleeve means is held in position by a central portion of said second element.

4. A pipe joint for filtering vibrations produced by an internal combustion engine comprising:

an exhaust pipe assembly connected to said engine and which further comprises first and second pipes having first and second adjacent end portions, each of said end portions forming a spherical member;

a connecting mechanism interconnecting said first and second end portions, wherein said connecting mechanism further comprises;

an internal cylindrical element having first and second beveled end portions disposed, respectively, within said spherical members of said first and second end portions;

a second external element mounted on a central portion of said cylindrical element and having first and second opposite ends;

a ring member mounted on said cylindrical element between said cylindrical element and a portion of said second element;

first and second envelope members engaging and interconnecting, respectively, said first and second spherical members and said opposite ends of said second element for holding the pipe joint in place; and first and second graphite rings mounted on said cylindrical element adjacent said first and second beveled end portions and complementarily engaging an interior surface portion, respectively, of said first and second spherical elements; and spring means mounted between a central portion of the second element and each of said graphite rings for biasing said grahite rings into engagement with said first and second spherical members.

5. A pipe joint for filtering vibrations produced by an internal combustion engine comprising:

an exhaust pipe assembly connected to said engine and which further comprises first and second pipes having first and second adjacent end portions, each of said end portions forming a spherical member;

a connecting mechanism interconnecting said first and second end portions, wherein said connecting mechanism further comprises:

an internal cylindrical element having first and second end portions, disposed, respectively, within said spherical members of said first and second end portions;

a second external element mounted on a central portion of said cylindrical element having first and second opposite ends extending therefrom;

a ring member mounted on said cylindrical element between said cylindrical element and a portion of said second element;

first and second envelope members enveloping, respectively, said first and second spherical members and engaging opposite ends of said second element for holding the pipe joint in place;

first and second graphite rings engaging an interior and exterior surface portion of each of said spherical members, respectively, said second exterior graphite ring also engaging an interior portion of each of said first and second envelope members and said first interior graphite ring extending into a set-back portion formed between end portions of said internal cylindrical element and said spherical members; and spring means mounted between a central portion of the second element and each of said graphite rings for biasing said graphite rings into engagement with said first and second spherical members.

* * * * *